(12) United States Patent
Panicker et al.

(10) Patent No.: US 8,861,569 B2
(45) Date of Patent: *Oct. 14, 2014

(54) REDUCED COMPLEXITY CHANNEL ESTIMATION FOR UPLINK RECEIVER

(75) Inventors: John P. Panicker, Orleans (CA); Gary Boudreau, Kanata (CA); Michael Petras, Nepean (CA); Ed Illidge, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,736

(22) Filed: Sep. 15, 2012
(Under 37 CFR 1.47)

(65) Prior Publication Data

US 2013/0182746 A1 Jul. 18, 2013

Related U.S. Application Data

(63) Continuation of application No. 13/129,003, filed as application No. PCT/IB2009/007687 on Nov. 13, 2009.

(60) Provisional application No. 61/114,346, filed on Nov. 13, 2008, provisional application No. 61/122,553, filed on Dec. 15, 2008, provisional application No. 61/151,644, filed on Feb. 11, 2009.

(51) Int. Cl.
*H04L 25/02* (2006.01)

(52) U.S. Cl.
CPC .......... *H04L 25/0256* (2013.01); *H04L 25/022* (2013.01); *H04L 25/0204* (2013.01); *H04L 25/0232* (2013.01)
USPC ............ 375/144; 375/141; 375/140; 375/130

(58) Field of Classification Search
CPC .................................................. H04L 25/0256
USPC .................................. 375/144, 141, 140, 130
See application file for complete search history.

(56) References Cited

U.S. PATENT DOCUMENTS

| 6,563,861 | B1 * | 5/2003 | Krasny et al. | 375/150 |
| 6,611,794 | B1 * | 8/2003 | Fleming-Dahl | 702/191 |

(Continued)

FOREIGN PATENT DOCUMENTS

| RU | WO 99/43102 A1 | 8/1999 |
| RU | WO 02/080375 A2 | 10/2002 |
| WO | 2004/038984 A2 | 5/2004 |

OTHER PUBLICATIONS

Russian Office Action dated May 7, 2013.
Japanese Office Action dated Apr. 12, 2013.
Chinese Office Action dated Jul. 1, 2013 in Chinese Application No. 200980145266.2.

(Continued)

*Primary Examiner* — Michael Neff

(57) ABSTRACT

The present invention proposes an LTE eNodeB receiver channel estimation technique that is referred to as reduced complexity minimum mean squared error (MMSE) technique for channel estimation. From the invention's assumptions, estimations and modified calculations, the present invention generates precise channel estimates of RS using the reduced complexity MMSE matrix and previously computed LS channel estimates $H_{LS}$ is as follows: (Formula I) which generates precise channel estimates of RS using the reduced complexity MMSE matrix and previously computed LS channel estimates. As a second aspect of the present invention, it is desired that the SNR be estimated within −3 dB of the actual channel SNR. As a third aspect of the invention, an adaptive method of data channel interpolation from RS channel is being proposed in this invention.

16 Claims, 11 Drawing Sheets

(56) References Cited

U.S. PATENT DOCUMENTS

| | | | |
|---|---|---|---|
| 2003/0016645 A1* | 1/2003 | Siala et al. | 370/342 |
| 2004/0091118 A1* | 5/2004 | Griesinger | 381/20 |
| 2008/0019331 A1* | 1/2008 | Thomas et al. | 370/338 |
| 2009/0180557 A1* | 7/2009 | Lin et al. | 375/260 |
| 2011/0286499 A1* | 11/2011 | Panicker et al. | 375/148 |

OTHER PUBLICATIONS

Russian Office Action dated Sep. 20, 2013 in Russian Application No. 2011123469.

Chinese Office Action dated Mar. 5, 2014 in Chinese Application No. 200980145266.2 (Chinese and English Versions).

\* cited by examiner

Figure 2: LTE uplink RS pattern

REDUCED COMPLEXITY CHANNEL ESTIMATION FOR UPLINK RECEIVER

CROSS-REFERENCE TO RELATED APPLICATIONS

This application is related to Provisional Patent Application Ser. Nos. 61/114,346 filed on Nov. 13, 2008, 61/122,553 filed on Dec. 15, 2008, and 61/151,644 filed on Feb. 11, 2009, and priority is claimed for this earlier filing under 35 U.S.C. §119(e). The Provisional Patent Application is also incorporated by reference into this utility patent application.

TECHNICAL FIELD OF THE INVENTION

This application relates to wireless communication techniques in general, and specifically to improving user equipment connectivity by increasing the accuracy of channel estimation and reducing overhead on the system through use of reduced complexity channel estimation.

BACKGROUND OF THE INVENTION

An IP-based mobile system includes at least one mobile node on a wireless communication system. A "mobile node" is sometimes referred to as user equipment, mobile unit, mobile terminal, mobile device, or similar names depending on the nomenclature adopted by particular system providers. The various components on the system may be called different names depending on the nomenclature used on any particular network configuration or communication system.

For instance, "mobile node" or "user equipment" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like. The term "mobile node" also includes a mobile communication unit (e.g., mobile terminal, "smart phones," nomadic devices such as laptop PCs with wireless connectivity).

User equipment or mobile nodes are receivers of signals in an uplink direction of signals transmitted from an access point, which is called a transmitter in that configuration. Terms, such as transmitter or receiver, are not meant to be restrictively defined, but could include various mobile communication units or transmission devices located on the network. Further, the words "receiver" and "transmitter" may be referred to as "access point" (AP), "basestation," or "user equipment" depending on which direction the communication is being transmitted and received. For example, an access point AP or a basestation (eNodeB or eNB) is the transmitter and user equipment is the receiver for downlink environments, whereas an access point AP or a basestation (eNodeB or eNB) is the receiver and user equipment is the transmitter for uplink environments.

Accurate channel estimation is integral to maintaining connectivity, achieving good capacity and throughput performance on the uplink communication link supporting transmission from a mobile node (or user equipment) to a base station (or access point) on an LTE wireless system. When the mobile node or user equipment is traveling at high velocities relative to the access point (transmitter), the known channel estimation methods have two major deficiencies that can have a negative impact on system performance. First, the known channel estimation methods (for example, a minimum mean squared error (MMSE) based estimation) prove to be inaccurate as the user equipment (or mobile node) travel at high velocities. Second, the known channel estimation equations are computationally intensive, which unnecessarily consumes system resources, increases system overhead, and increases the time needed to complete the channel estimation. Thus, to realize good capacity/throughput performance at high mobility and/or high channel frequencies, the issues of performance degradation due to channel estimation inaccuracy need to be addressed, as well as the need to reduce the complexity of the channel estimation algorithms.

The minimum mean squared error (MMSE) based channel estimator utilizes the second-order statistics of the channel conditions to minimize the mean-square error of the channel estimates. An underlying assumption is that the time domain channel vector is Gaussian and uncorrelated with the channel noise. Linear MMSE channel estimate is given as follows:

$$\hat{H}_{LMMSE} = R_{HH}(R_{HH} + \sigma_N^2 (XX^*)^{-1})^{-1} \hat{H}_{LS} \qquad (1)$$

where
$R_{HH} = E[HH^*]$ is the frequency domain channel correlation matrix, H is the frequency domain channel response, * denotes conjugate transpose
X is the vector containing known pilot or the known reference symbol (RS) sequence,
$\sigma_N^2$ is the variance of the channel noise,
$\hat{H}_{LS} = X^{-1} y$, is the Least Squares (LS) estimate of the channel where y is the received vector of RS symbols.

The MMSE estimator yields much better performance than LS channel estimators by themselves, especially under the low SNR scenarios such as low velocity of the user equipment. A major drawback of the MMSE estimator, however, is its high computational complexity because of the increased consumption of system resources and increased system overhead from performing the full MMSE equation.

In equation (1), X denotes the known reference signal (RS) sequence transmitted by the UE. It should be noted that in the LTE standard, sequence hopping and group hopping are allowed for the uplink RS sequence. If sequence/group hopping is enabled, then the above MMSE equation will require that two matrix inverses be performed every slot (0.5 msec). With on RB allocation to any user, the matrix size is 12×12 whereas with all 48 RBs allocation to one user, the matrix size is 576×576. Such real-time matrix inversions are computationally intensive for practical implementation, and this MMSE equation proves to be inaccurate as the user equipment (or mobile node) travel at higher velocities.

It should be noted that signal-to-noise ratio (SNR) estimation is an essential processing step in the eNodeB receiver in some circumstances, and if there is an under-estimation of the SNR, system performance is degraded. As such, there is a need to accurately estimate the SNR for use in certain channel estimation procedures to enhance system performance and minimize degradation of system parameters.

It should be noted further that channel estimation methods also use interpolation, and the several approaches for interpolation (e.g linear, bilinear, or quadratic etc.) do not provide a satisfactory result in certain circumstances. These approaches to interpolation are static and the same approach is generally used for all UE mobilities, and as such does not provide the optimum SNR vs. SER performance for certain situations.

SUMMARY OF THE INVENTION

The present invention proposes an LTE eNodeB receiver channel estimation technique that is referred to as reduced complexity minimum mean squared error (MMSE) technique for channel estimation. This technique provides channel estimation/demodulation performance comparable to that of MMSE channel estimation, at a much reduced implementation complexity (hardware/computational complexity).

The reduced complexity MMSE equation is derived by making several key assumptions based on known system performance attributes and system performance parameters as follows: (1) replace the term $(XX^*)^{-1}$ with its expectation $(E\{XX^*\}^{-1})$, (2) the signal constellation is the same on all subcarriers in the RS symbol and has equal probability on all constellation points, $E\{XX^*\}^{-1}=E\{|1/X_k|^2\}*I$ where I is identity matrix, (3) define the average $SNR=E\{|X_k|^2\}/\sigma_N^2$, the term $\beta=E\{|1/X_k|^2\}/E\{|1/X_k|^2\}$, and the term $\sigma_N^2(XX^*)^{-1}=(\beta/SNR)I$, where $\beta$ is a constant depending only on the signal constellation, (4) for a QPSK constellation $\beta=1$, for a 16 QAM constellation $\beta=0.5294$, and for a 64-QAM transmission $\beta=0.3724$, (5) for the LTE uplink transmission, the $R_{HH}$ matrix is dependent only on the subcarrier spacing the r.m.s delay spread of the channel, (6) the same matrix can be used for several subframes until a different SNR estimate is received (even if sequence and group hopping are enabled), (7) utilizing the simplicity in the generation of the channel autocorrelation for the LTE uplink RS pattern, (8) assuming an exponentially decaying power delay profile (which is a widely accepted industry standard for channel power profile), (9) assuming Jakes spectrum for the Doppler spread, (10) for the LTE Uplink RS pattern, the time correlation function among the RS pattern is 1, which is due to the fact that all the reference symbols are in the same OFDM symbol, (11) assume a value of 2 usec for r.m.s delay spread in generation of $R_{HH}$. This is based on simulation results indicating that the accuracy of the channel estimates are not too sensitive to the r.m.s. delay spread value, (12) In every slot (0.5 msec duration), estimate $\hat{H}_{LS}=X^{-1}y$, where y is the received vector of RS symbols and X is a vector of known transmitted CAZAC sequence in the UL RS symbol, (13) obtain SNR estimates from previous slots or subframes if user equipment is continuously transmitting, or in case of discontinuous transmission, estimate the SNR using the channel estimates $\hat{H}_{LS}$; (14) use known values for $\beta$ (1 for QPSK, 0.5294 for 16-QAM, 0.3724 for 64-QAM), SNR estimates, and $R_{HH}$.

From these assumptions, estimations and modified calculations, the present invention generates precise channel estimates of RS using the reduced complexity MMSE matrix and previously computed LS channel estimates $\hat{H}_{LS}$ as follows:

$$\hat{H}_{red\_cmplx} = R_{HH}\left(R_{HH} + \frac{\beta}{SNR}I\right)^{-1}\hat{H}_{LS}$$

As a second aspect of the present invention, it is noted that signal-to-noise ratio (SNR) estimation is an essential processing step in the eNodeB receiver for use with the reduced complexity minimum mean squared error (RC-MMSE) channel estimation. The performance of the present invention (reduced complexity MMSE channel estimation) technique has some sensitivity to the estimated SNR. The demodulation SER vs. actual SNR has been determined for SNR estimation errors within +/−dB. It is to be noted that an over-estimation of the SNR results in slightly better performance whereas under-estimation of SNR results in worse performance. In order to limit the performance degradation, it is desired that the SNR be estimated within −3 dB of the actual channel SNR. As a third aspect of the invention, an adaptive method of data channel interpolation based on the RS signal is being proposed in this invention.

BRIEF DESCRIPTION OF THE DRAWINGS

Embodiments of the present application will now be described, by way of example only, with reference to the accompanying drawing figures, wherein.

DETAILED DESCRIPTION OF THE PREFERRED EMBODIMENTS

Figure 1:
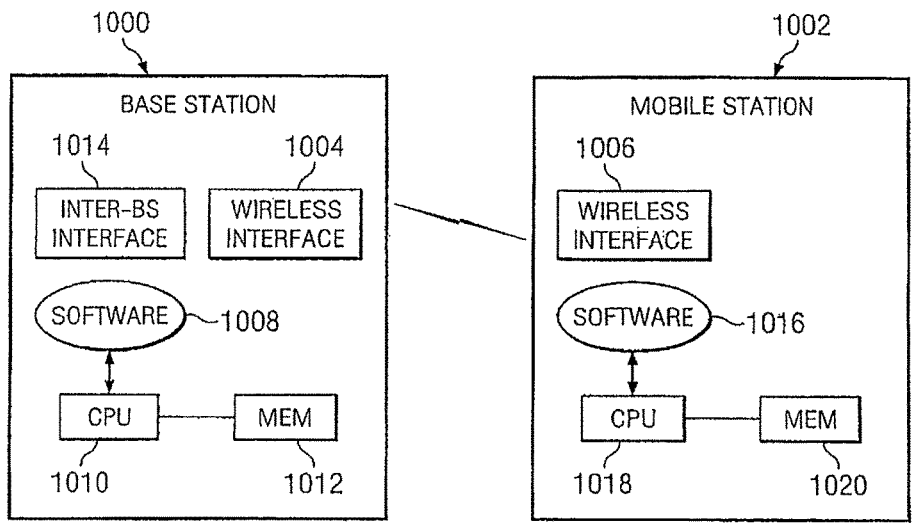
FIG. 1 is a block diagram of the communication system using the present invention; and, FIG. 2 is a figure showing the blocks allocated to the cellular spectrum in an LTE transmission.

Exemplary components of a system using the present invention include base station 1000 and mobile station 1002 as depicted in FIG. 1. The base station 1000 includes a wireless interface 1004 to communicate wirelessly over a wireless link with a wireless interface 1006 in the mobile station 1002. The base station 1000 includes software 1008 that is executable on more or more central processing units (CPUs) 1010 in the base station 1000 to perform tasks of the base station. The CPUs 1010 is (are) connected to a memory 1012. The software 1008 can include a scheduler and other software modules. The base station 1000 also includes an inter-base station interface 1014 to communicate information with another base station, such as backhaul information and/or coordination information.

Similarly, the mobile station 1002 includes software 1016 executable on one or more CPUs 1018 connected to a memory 1020. The software 1016 is executable to perform tasks of the mobile station 1002. Instructions of such software (1008 and 1016) can be loaded for execution onto the CPUs or other types of processors. The processor can include a microprocessor, microcontroller, processor module or subsystem (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (ERPROMs) and flash memories; magnetic disks such as fixed, floppy and removable disks; other magnetic media including tape; and optical media such as compact disks (CDs) or digital video disks (DVDs).

The channel is estimated based on an indicator signal that is periodically broadcast on the forward or uplink in the frame signaling structure. In this embodiment, the mobile station 1002 would receive the indicator channel signaling as received from a transmission. The mobile station 1002 can also be referred to as an access terminal. The mobile station 1002 may perform the channel estimation calculations or provide feedback to the basestation 1000 based on the channel estimation protocols performed, where the basestation will perform the channel estimation calculation.

From the channel estimations, the basestation 1000 or the mobile station 1002 will determine how the mobile station 1002 is being served and the basestation 1000 may make determinations about whether the mobile station 1002 will need to monitor the communications channel. The basestation 1000 may also schedule communications to be transmitted from the basestation 1002 based on the channel estimation calculation. The basestation 1000 may also schedule users to avoid interference and overlapping beam situations.

The minimum mean squared error (MMSE) based channel estimator utilizes the second-order statistics of the channel conditions to minimize the mean-square error of the channel estimates. An underlying assumption is that the time domain channel vector is Gaussian and uncorrelated with the channel noise. The linear MMSE channel estimate is given as follows:

$$\hat{H}_{LMMSE} = R_{HH}(R_{HH} + \sigma_N^2(XX^*)^{-1})^{-1}\hat{H}_{LS} \quad (1)$$

where
$R_{HH} = E[HH^*]$ is the frequency domain channel correlation matrix, H is the frequency domain channel response, * denotes conjugate transpose
X is the vector containing known pilot or the known reference symbol (RS) sequence,
$\sigma_N^2$ is the variance of the channel noise,
$\hat{H}_{LS} = X^{-1}y$, is the Least Squares (LS) estimate of the channel where y is the received vector of RS symbols.

The MMSE estimator yields much better performance than LS channel estimators by themselves, especially under the low SNR scenarios. A major drawback of the MMSE estimator, however, is its high computational complexity because of the increased consumption of system resources and increased system overhead from evaluating the full MMSE equation.

In the MMSE equation, X denotes the known reference signal (RS) sequence transmitted by UE. It should be noted that in LTE standard systems, sequence hopping and group hopping are allowed for uplink RS sequence, and if sequence/group hopping is enabled, the above MMSE equation will require that two matrix inversions be performed every slot (0.5 msec). With one RB allocation to any user, the matrix size is 12×12 and whereas with all 48 RBs allocation to one user, the matrix size is 576×576. Such real-time matrix inversions are computationally intensive for practical implementations. A second point to note is that this MMSE equation proves to be inaccurate as the user equipment (or mobile node) travel at higher velocities.

Some reduction in the complexity of the MMSE technique described above can be achieved by the proposed method as follows: (1) replace the term $(XX^*)^{-1}$ with the expectation $E\{(XX^*)^{-1}\}$, (2) as the signal constellation is same on all subcarriers in the RS symbol and has equal probability on all constellation points, $E\{(XX^*)^{-1}\} = E\{|1/Xk|^2\}*I$ where I is identity matrix, (3) define the average $SNR = E\{|Xk|^2\}/\sigma_N^2$, the term $\beta = E\{|1/Xk|^2\}/E\{|1/Xk|^2\}$, and the term $\sigma_N^2(XX^*)^{-1} = (\beta/SNR)I$, where $\beta$ is a constant depending only on the signal constellation, (4) for a QPSK constellation $\beta=1$, for a 16 QAM constellation $\beta=0.5294$, and for a 64-QAM transmission $\beta=0.3724$, and (5) for the LTE uplink transmission, the $R_{HH}$ matrix is dependent only on the subcarrier spacing the r.m.s delay spread of the channel.

From these assumptions and the MMSE channel estimation equation can be reduced to the following:

$$\hat{H}_{red\_cmplx} = R_{HH}\left(R_{HH} + \frac{\beta}{SNR}I\right)^{-1}\hat{H}_{LS} \quad (2)$$

The advantage with the implementation as in Eqn. (2) is that there is only one inverse to be computed and that matrix contains constant values. The same matrix can be used for several subframes until a different SNR estimate is received (even if sequence and group hopping are enabled).

Further reduction in complexity can be achieved by utilizing the simplicity in the generation of the channel autocorrelation of the LTE uplink RS pattern. The channel autocorrelation for a time-frequency OFDM grid may be written as the product of the frequency and time correlation functions.

$$E\{p_{k,l}\hat{p}^*_{k'l'}\} = R_{HH} = r_f(k-k')r_t(l-l') \quad (3)$$

where $r_f$ and $r_t$ denote frequency correlation function and time correlation function, k the subcarrier number, and l the symbol time index.

By assuming an exponentially decaying power delay profile (which is the widely accepted industry standard for channel power profile), the frequency correlation functions can be written as:

$$r_f(k) = \frac{1}{1 + j2\pi\tau_{rms}k/T} \quad (4)$$

where 1/T is the subcarrier separation (which is 15 KHz for LTE), and $\tau_{rms}$ is the r.m.s delay spread of the channel.

By assuming Jakes spectrum for the Doppler spread, the time correlation function can be written as:

$$r_t(l)J_o(2\pi f_{max}lT_s) \quad (5)$$

Where $J_o$ is Bessel function of first order the first kind, $f_{max}$ is the maximum Doppler spread and $T_s$ is the OFDM symbol duration.

For the LTE Uplink RS pattern, the time correlation function among the RS patter is 1. This is due to the fact that all the reference symbols are in the same OFDM symbol. Therefore, the channel autocorrelation in Eqn. (3) may be written as $$E\{p_{k,l}\hat{p}^*_{kT}\}=R_{HH}=r_f(k-k') \quad (6)$$

The procedure for reduced complexity MMSE channel estimation for LTE Uplink receiver is as follows: the present invention generates and stores $R_{HH}$ as per equations (6) and (4) for all RB allocations (1, 2, 3, 4, ... $N_{RB}$) in memory for channel estimation. It is safe to assume a value of 2 usec for r.m.s delay spread in generation of $R_{HH}$. Simulations indicate that the accuracy of the channel estimates is not too sensitive to the r.m.s delay spread value. This would imply storage of matrices of size (12×12, 24×24, ... 576×576). This is a one time event and need not be repeated. If storage is an issue, then it could be generated in real-time although this is not an efficient use of computing resources.

In every slot (0.5 msec duration), estimate $\hat{H}_{LS}=X^{-1}y$ where y is the received vector of RS symbols and X is a vector of known transmitted constant amplitude zero autocorrelation (CAZAC) sequence in the UL RS symbol. If the RS group and sequence hopping are disabled, then the contents of X remain the same for that user. If the RS group and sequence hopping are enabled, then the contents of X can change in every slot or subframe.

The present invention obtains an SNR estimate from the previous slot or subframe if the UE is continuously transmitting, or in the case of discontinuous transmission, an estimate of the SNR is obtained using the channel estimates $\hat{H}_{LS}$.

Using known values for $\beta$ (1 for QPSK, 0.5294 for 16-QAM, 0.3724 for 64-QAM), SNR estimates, and $R_{HH}$, generate the reduced complexity MMSE matrix $$R_{HH}\left(R_{HH}+\frac{\beta}{SNR}I\right)^{-1}$$

The present invention generates precise channel estimates of RS using the reduced complexity MMSE matrix and previously computer LS channel estimates $\hat{H}_{LS}$ as in equation (2) repeated below:

$$\hat{H}_{red\_cmplx}=R_{HH}\left(R_{HH}+\frac{\beta}{SNR}I\right)^{-1}\hat{H}_{LS}$$

From the MMSE estimates of RS provided in the present invention, data channel estimates can be generated using linear interpolation.

Simulation results are shown in FIGS. 3-12 where: (1) channel estimation and demodulation performance was varied for QPSK, 16 QAM, 64 QAM modulations at UE mobilities of 3 km/hr, 60 km/hr, 120 km/hr and 350 km/hr, (2) the receiver is comprised of a single antenna at the eNodeB, (3) uncoded modulation symbol error rate SER vs. SNR is plotted, (4) a carrier frequency of 2 GHz is assumed so that the maximum Doppler spread at 3 km/hr, 60 km/hr, 120 km/hr and 350 km/hr is 5 Hz, 100 Hz, 200 Hz, 600 Hz, respectively, (5) with two receiver antennas, turbo code and interleaving, an additional performance gain of approximately 10 dB (depending on code rate and channel) is expected for the SER vs. SNR, (6) the RS channel estimates are directly applied to the data channel for demodulation in the simulation results.

FIGS. 3-6 provide QPSK demodulation performance comparisons.

Figure 7:
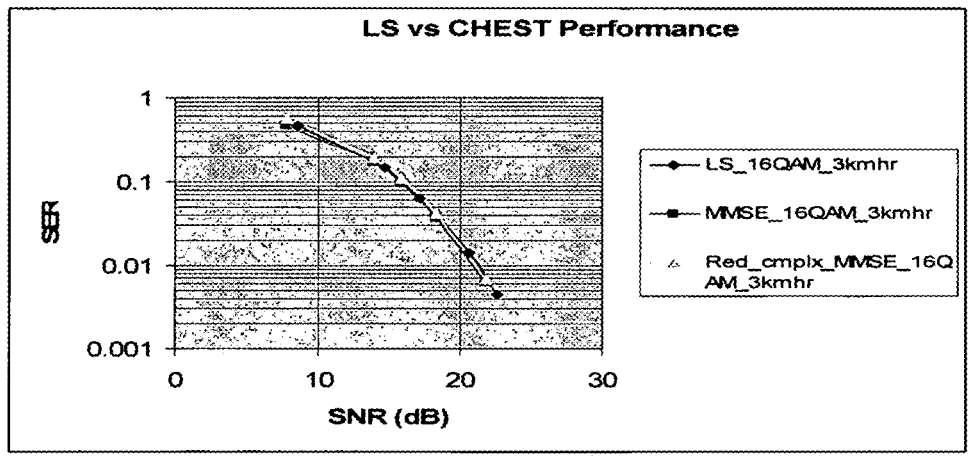
FIG. 7 illustrates SER vs. SNR for 16 QAM modulation and UE mobility of 3 Km/hr.
Figure 8:
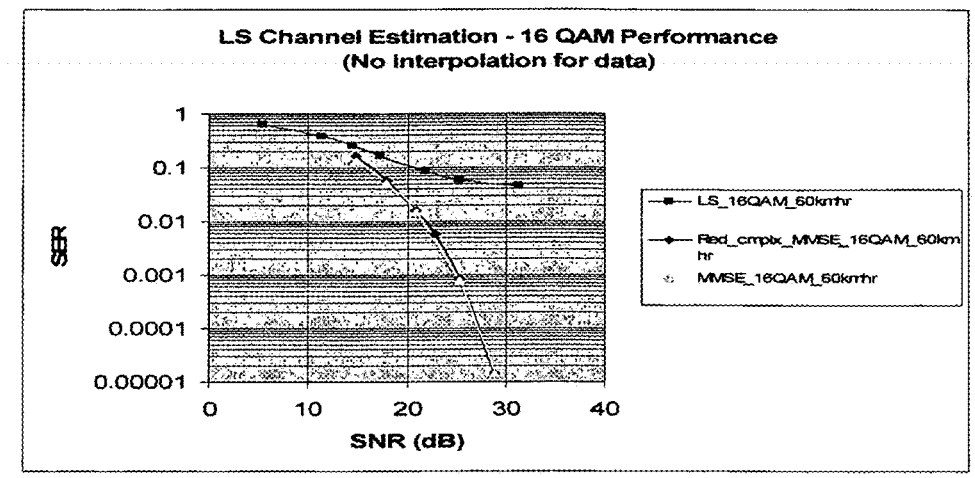
FIG. 8 illustrates SER vs. SNR for 16 QAM modulation and UE mobility of 60 Km/hr.
Figure 9:
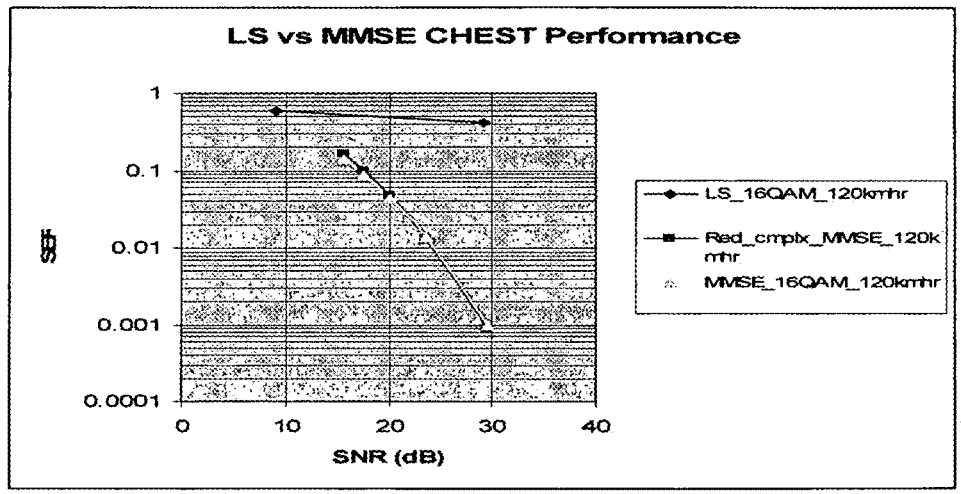
FIG. 9 illustrates SER vs. SNR for 16 QAM modulation and UE mobility of 120 Km/hr.

FIGS. 7-9 provide 16 QAM demodulation performance comparisons.

Figure 10:
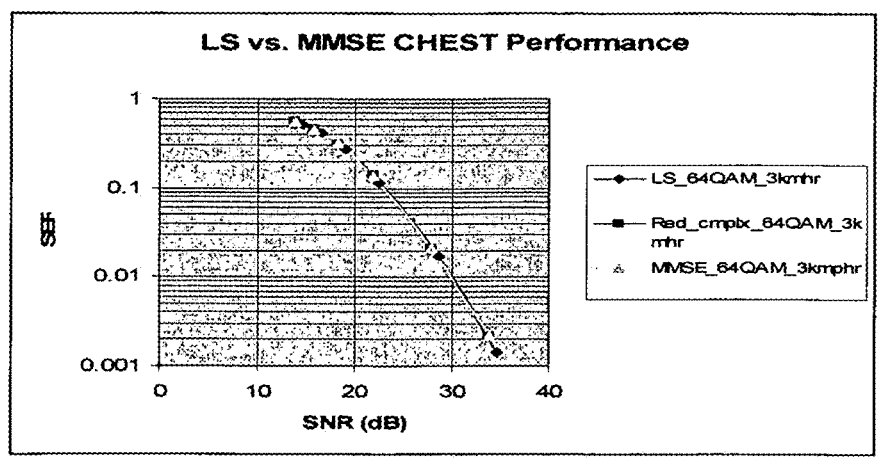
FIG. 10 illustrates SER vs. SNR for 64 QAM modulation and UE mobility of 3 Km/hr.
Figure 11:
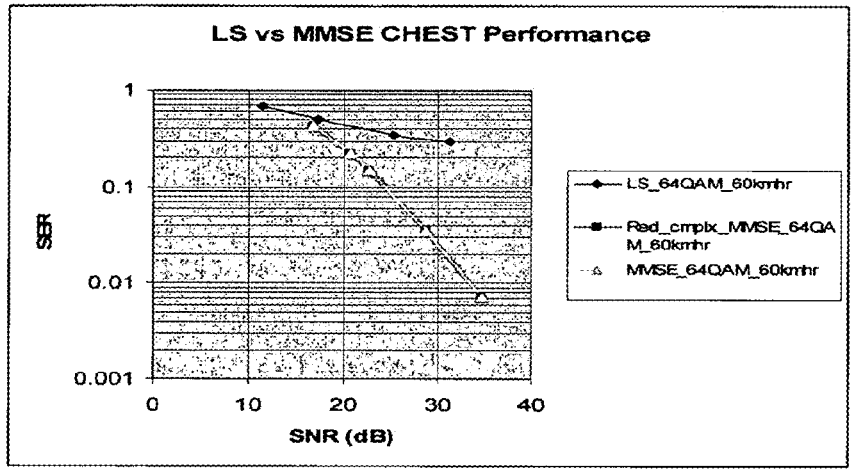
FIG. 11 illustrates SER vs. SNR for 64 QAM modulation and UE mobility of 60 Km/hr.
Figure 12:
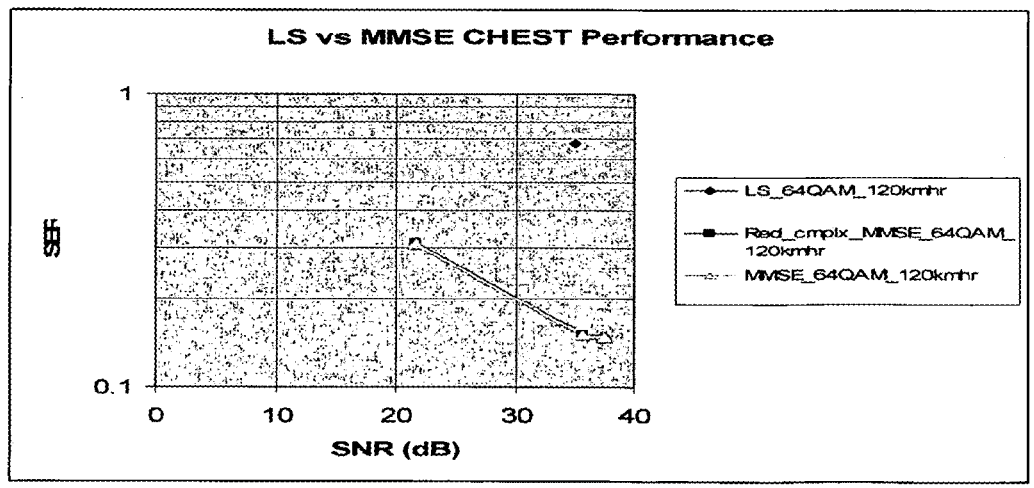
FIG. 12 illustrates SER vs. SNR for 64 QAM modulation and UE mobility of 120 Km/hr.

FIGS. 10-12 provide 64 QAM demodulation performance comparisons.

The reduced complexity MMSE channel estimation method of the present invention provides equivalent accuracy to support QPSK modulations up to 350 km/hr with reduced overhead, reduced calculation times, and increased system performance.

For 16 QAM modulations, the channel estimation accuracy can support mobilities up to 120 km/hr. For higher mobilities using 16 QAM, the inter-carrier interference (ICI) becomes dominant and techniques such as MMSE that considers noise as AWGN cannot improve channel estimation performance by increasing the SNR. As will be explored in the second embodiment, techniques that perform ICI cancellation combined with channel estimation are likely more effective for such dense constellations at those higher mobilities using 64 QAM modulations.

For 64 QAM modulations, the channel estimation accuracy can support mobilities up to 60 km/hr. For 64 QAM modulations, the channel estimation accuracy is not robust and therefore the ICI at 120 km/hr cannot provide satisfactory demodulation performance as shown in FIG. 12. Techniques that perform joint ICI cancellation and channel estimation are likely more effective for such dense constellations at those higher mobilities using 64 QAM modulations.

Figure 13:
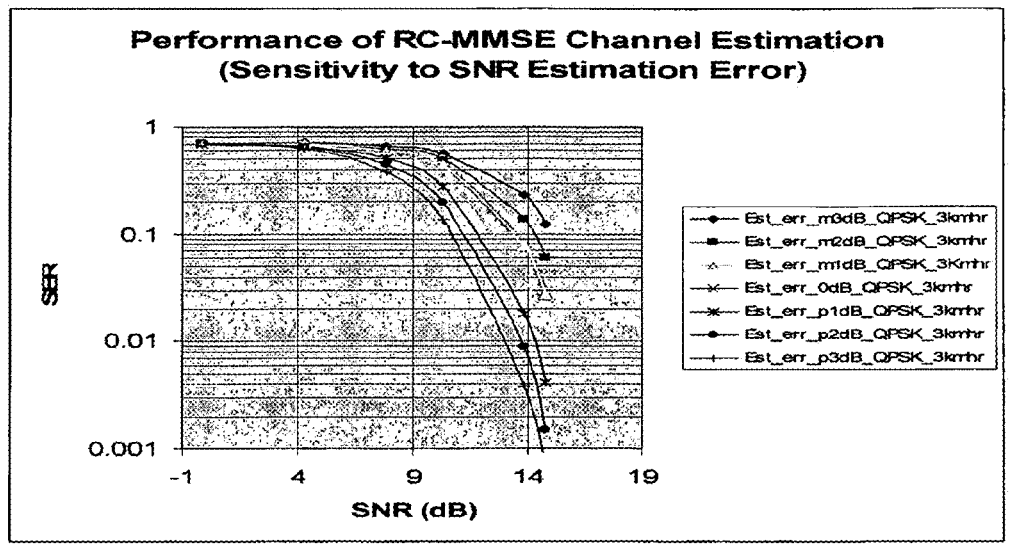
FIG. 13 illustrates RC-MMSE channel estimation performance sensitivity to SNR estimation error.

It should be noted that accurate estimation of the signal-to-noise ratio (SNR) is an essential processing step in the eNodeB receiver for use with the present invention of reduced complexity minimum mean squared error (RC-MMSE) channel estimation. The performance of the present invention (reduced complexity MMSE channel estimation) technique has some sensitivity to the estimated SNR. The demodulation SER vs. actual SNR is plotted for SNR estimation errors within +/−3 dB in FIG. 13. It should be noted that an over-estimation of SNR results in worse performance. In order to limit the performance degradation, it is desired that the SNR be estimated within −3 dB of the actual channel SNR.

Even though an over-estimation of SNR may help RC-MMSE channel estimation performance, an overestimated SNR can cause performance degradation to algorithms for scheduling (for resource allocation), modulation and coding control, handoff, power control, and soft decision decoding. Therefore, it is essential to estimate SNR as accurately as possible to minimize overall system performance degradation.

More accurate SNR estimation that is part of a second aspect of the invention is comprised of a two-part estimation: (i) signal power estimation, and (ii) noise plus interference variance estimation. Signal power estimation are relatively straightforward and can be performed from the channel estimates. However, the accurate estimation of the variance of noise or interference is complex.

Conventional algorithms for noise variance estimation assumes that the noise statistics remain constant (white noise) over the allocation bandwidth. In practical LTE deployments, with frequency reuse of N=1, every cell-site in the network will use the same set of physical resource blocks (PRB) in every sector. Even with interference mitigation through coordination, there will be significant overlap in PRB allocations from adjacent cells/sectors. Partially or completely overlapped resource blocks from a distant cell introduce co-channel interference (CCI).

There is also adjacent channel interference (ACI) resulting from inadequate filtering of the adjacent channel, and inter-carrier interference (ICI) due to spectral broadening from Doppler spreads at high user equipment (UE) mobilities. These interferences are in general, not white, but colored in nature with uneven spectral density across the bandwidth. In reality, the total noise present in the uplink receiver is often made up of white Gaussian noise along with correlated colored noise.

In the sections below, the method and the procedure are proposed for SNR estimation from the RC-MMSE channel estimator in the eNodeB receiver. The SNR estimated from the user equipment's physical random access channel (PRACH) preamble or the sounding reference signal (SRS) may be used for the physical uplink shared channel (PUSCH) first slot demodulation reference signal (DMRS) channel estimation. The second slot DRS channel estimation may use the updated SNR estimated from the first slot DMRS using the method described below.

As part of the signal interference to noise ratio estimation in an LTE uplink, the received RS signal after the FFT, at nth symbol for kth subcarrier, may be written as $$Y_{n,k} = S_{n,k} H_{n,k} + I_{n,k} + W_{n,k}$$

$$Y_{n,k} = S_{n,k} H_{n,k} + Z_{n,k} \quad (7)$$

where
$S_{n,k}$ is the transmitted RS symbol
$H_{n,k}$ is the value of the channel frequency response (CFR),
$I_{n,k}$ is the colored noise (interference) that includes CCI, ACI, and ICI
$W_{n,k}$ is the white Gaussian noise samples
$Z_{n,k}$ is the overall noise term It is assumed that the impairments due to imperfect synchronization, transceiver non-linearities etc. are folded into $W_{n,k}$. It is also assumed that the CFR is not changing within the observation times.

The reference signal (RS) used for the channel estimation in the LTE uplink occur in the same SC-FDMA symbol. This is true for all LTE uplink physical channels (SRS, PRACH, PUCCH and PUSCH). As the proposed SNR estimation method makes use of the RS channel estimates and the knowledge of the code symbols in the RS, the mathematical expressions will drop the subscript, n, which stands for the symbol number.

Figure 14:
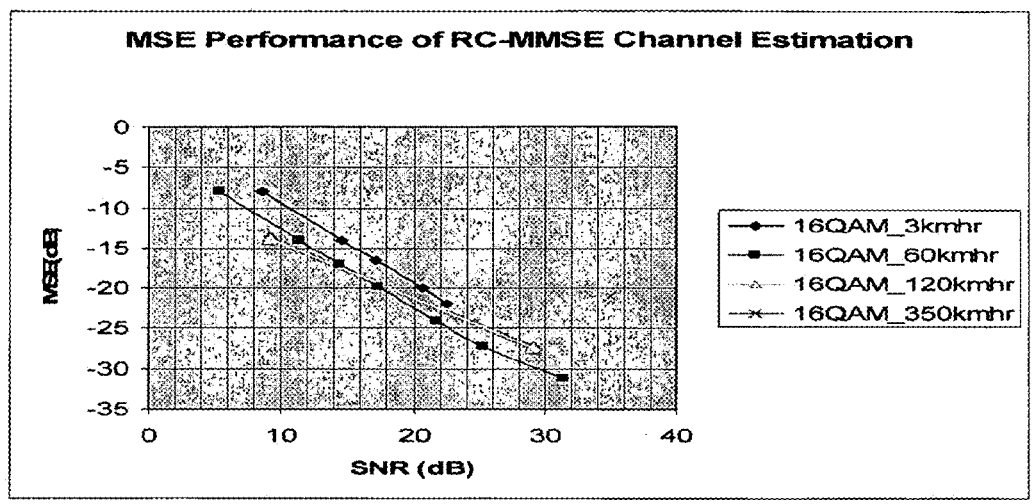
FIG. 14 illustrates the mean square error (MSE) performance of the RC-MMSE Channel estimation as a function of actual SNR at estimator input.

The signal power estimation of the proposed method is straightforward. It makes use of the channel estimates to obtain the useful signal power levels. The reduced complexity minimum mean squared error (RC-MMSE) channel estimation [1] provides estimates of the channel, $\hat{H}_{n,k}$ with mean squared error (MSE) of the estimates as low as −30 dB as shown in FIG. 14. The channel estimates can therefore be used to generate the average received signal power as $$S = \mathrm{avg}(|\hat{H}_k|^2) \quad (8)$$

The present invention proposes use of a signal regeneration (SR) estimator to estimate the level of interference plus noise. This approach for noise power estimation is based on finding the difference between the noisy received sample in the frequency domain and the best hypothesis of the noiseless received sample. The code symbol values, $S_k$, in the RS are known at the eNodeB receiver. Therefore, making use of the channel estimates, $\hat{H}_k$, the noise plus interference sample, $\hat{Z}_k$, may be written as $$\hat{Z}_k = Y_k - S_k \hat{H}_k \quad (9)$$

Accurate estimation of the interference plus noise variance is complex due to the different sources of noise and interference present at $\hat{Z}_k$, as well as their different spectral characteristics and mutual correlations. As mentioned previously, the interference component of the received signal consists of CCI, ACI, and ICI. For this discussion, the white Gaussian noise is modeled as $W_k = N(0, \sigma_0^2)$ and the interference term as $I_k = N(0, \sigma_k^2)$, where $\sigma_k$ is the local standard deviation.

The method of the present invention proposes a noise variance estimation that makes use of the signal regeneration from channel estimates; therefore, an additional component to the noise due to channel estimation error is also present. The channel estimation error may be modeled as a zero mean complex white Gaussian process of variance $E_k = N(0, \sigma_g^2)$.

Assuming that the interference and white noise terms are uncorrelated, the overall noise term, $\hat{Z}_k$, can be modeled as $\hat{Z}_k = N(0, \sigma'^2_k)$ where $\sigma'^2_k = \sigma_k^2 + \sigma_{0,g}^2$. The component $\sigma_{0,g}^2$ contains the variance of the white Gaussian noise part that includes the channel estimation error variance and $\sigma_k^2$ contains the variance of the colored interference noise. The goal is to estimate $\sigma'^2_k$ which can be used to find the SNR. Note that if $\sigma_{0,g}^2 \gg \sigma_k^2$ the overall noise can be assumed to be white and it is colored otherwise.

The method and procedure described herein assumes that $\sigma_{0,g}^2 \gg \sigma_k^2$, and therefore the total noise in the received samples follows a Gaussian distribution function.

The present invention produces an SNR estimate using the signal power obtained through Eqn. (8) and calculates the noise variance of the noise sample as defined by Eqn. (9) as follows:

$$SNR = \frac{|\hat{H}_K|^2}{\mathrm{Var}(|Y_k - S_k \hat{H}_k|)} \quad (10)$$

The performance of the SNR estimator in the present invention obtained from Eqn. (10) is shown in FIG. 15.

Figure 15:
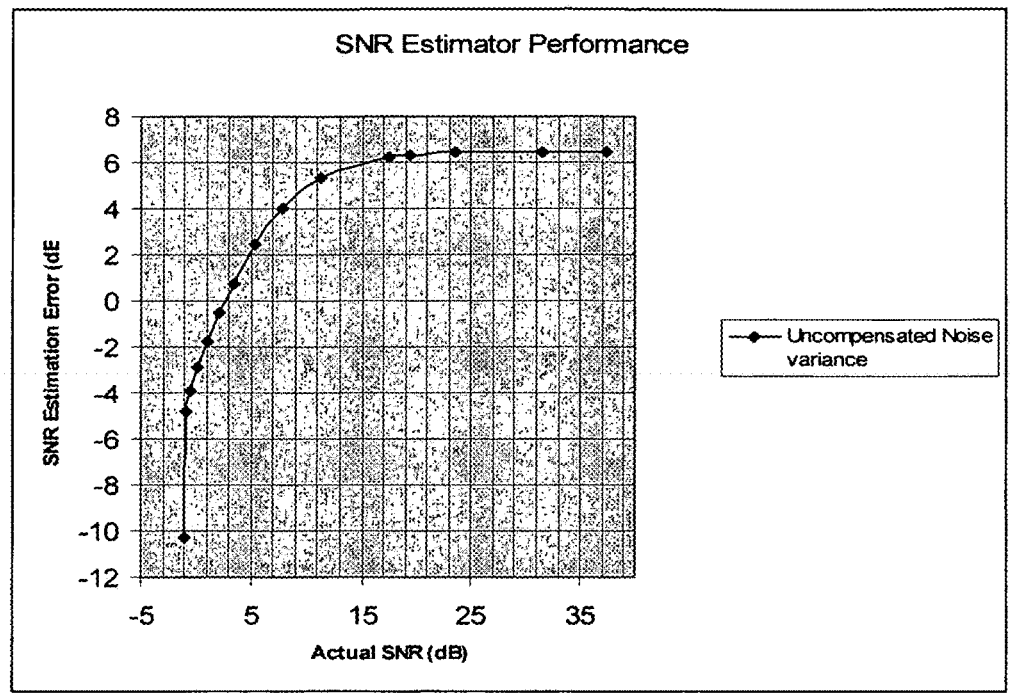
FIG. 15 illustrates SNR estimation error performance of the signal regeneration (SR) type estimator as a function of the actual SNR at the estimator input.

In FIG. 15, the SNR estimation error as a function of the actual SNR is shown. The SNR estimation error=Actual SNR−Estimated SNR. As seen from FIG. 15, the SNR is overestimated (which means that the noise variance is underestimated) at lower value of actual SNR, and SNR is underestimated (which means the noise variance is overestimated) at higher values of actual SNR.

The overestimation of noise variance at high values of SNR is partly due to the channel estimation error. At high values of SNR, the channel estimation error variance is comparable to the noise/interference variance that is being measured, therefore higher than actual noise/interference is being reported.

To compensate for the SNR estimation error, it is straightforward to assume that there is a direct relationship between the level of interference plus noise and the channel estimation error. In order to take into account the effect of channel estimation error variance on the overall noise variance estimation, and therefore to compensate for the total noise overestimation, it is proposed to introduce a compensation factor, ρ. The factor ρ is defined as the ratio between the variance of the channel estimation errors and the variance of the interference plus noise.

Using this ratio ρ, a more accurate estimate of the level of the SNR can be obtained from Eqn. (11).

$$SNR = \frac{|\hat{H}_K|^2}{\mathrm{Var}\left(\frac{1}{1+\rho}|Y_k - S_k \hat{H}_k|\right)} \quad (11)$$

The ratio ρ in Eqn. (11) compensates for the overestimation caused by channel estimation errors in Eqn. (10). The value of ρ can be optimized between 0 and 1. The factor ρ mainly depends on the performance of channel estimator. The performance of the channel estimation may be derived from the mean square channel estimation error (MSE) simulations of the channel estimator. In the ideal case of perfect channel estimation, ρ is equal to 0.

Figure 16:
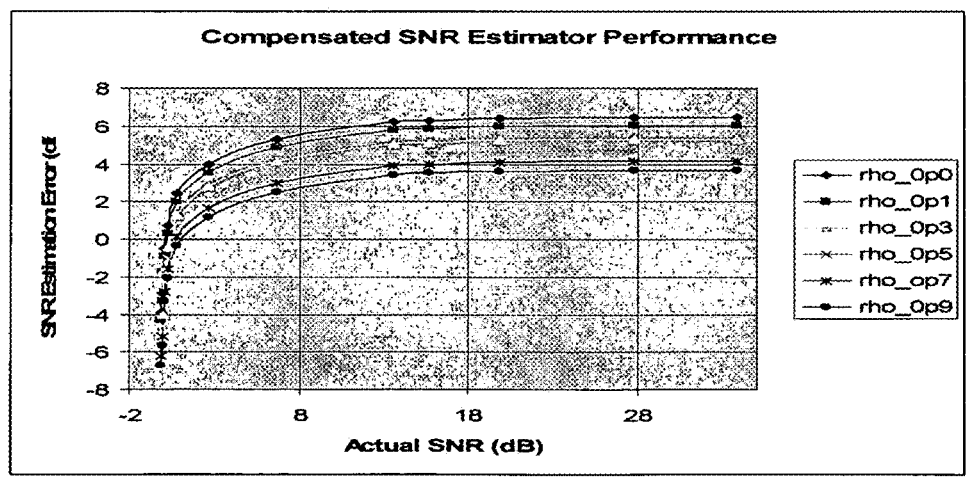
FIG. 16 illustrates the compensated SNR estimate as a function of the actual SNR.

The SNR estimation error after compensation as a function of the actual SNR is shown in FIG. 16 for various values of ρ.

The SNR estimation error for various values of the compensation factor, ρ are also provided in Table 1.

TABLE 1

SNR estimation error for various values of compensation factor, ρ.

| Actual SNR (dB) | Uncompensated SNR Est Error (dB) | SNR Estimation Error after Compensation (dB) | | | | |
|---|---|---|---|---|---|---|
| | ρ = 0 | ρ = 0.1 | ρ = 0.3 | ρ = 0.5 | ρ = 0.7 | ρ = 0.9 |
| 0.0045 | −2.867 | −3.28093 | −4.00643 | −4.62791 | −5.17149 | −5.65454 |
| 0.135 | −0.5132 | −0.92713 | −1.65263 | −2.27411 | −2.81769 | −3.30074 |
| 0.28 | 0.1702 | 0.296273 | −0.42923 | −1.05071 | −1.59429 | −2.07734 |
| 0.83 | 2.4258 | 2.011873 | 1.286366 | 0.664887 | 0.121311 | −0.36174 |
| 2.73 | 3.9679 | 3.553973 | 2.828466 | 2.206987 | 1.663411 | 1.180364 |
| 6.65 | 5.3188 | 4.904873 | 4.179366 | 3.557887 | 3.014311 | 2.531264 |
| 13.58 | 6.2178 | 5.803873 | 5.078366 | 4.456887 | 3.913311 | 3.430264 |
| 15.66 | 6.2996 | 5.885673 | 5.160166 | 4.538687 | 3.995111 | 3.512064 |
| 19.84 | 6.4114 | 5.997473 | 5.271966 | 4.650487 | 4.106911 | 3.623864 |
| 27.84 | 6.4432 | 6.029273 | 5.303766 | 4.682287 | 4.138711 | 3.655664 |
| 33.87 | 6.4543 | 6.040373 | 5.314866 | 4.693387 | 4.149811 | 3.666764 |

As can be seen from FIG. 16 and Table 1, the SNR estimation error compensation through ρ causes an overall smoothening of the SNR estimation error values. There is still some overestimation at low SNR, however, the underestimation is minimized at high values of SNR. The SNR estimation error is broadly within −6 dB/+4 dB range with a compensation factor of ρ=0.9. As a benchmark, it should be noted that this estimation performance is better than the power measurement accuracy requirement of +/−9 dB stipulated in the CDMA air interface standards.

In order to obtain accurate RS channel estimates from Equation (2), it is also necessary to make use of the frequency correlation among the subcarriers in the RS symbol. At low user equipment mobilities, these RS channel estimates may be applied directly for the data channel equalization. This is due to the fact that there is high correlation in the time domain between the RS channel estimates and data channel estimates. However, at higher user equipment mobilities (typically >60 km/hr), correlation in time domain decreases between the RS channel estimates and data channel estimates. Therefore, applying the RS channel estimates directly to equalize the data channel will result in a slightly degraded SNR vs. SER performance. At higher user equipment mobilities, the data channel estimates need to be interpolated from the RS channel estimates. There are several approaches for interpolation, including linear, bilinear, and quadratic approaches. These approaches to interpolation are static and the same approach is used for all UE mobilities, and therefore does not provide the optimum SNR vs. SER performance.

An adaptive method of data channel interpolation from RS channel is being proposed in this invention. In this approach, the time correlation function between the data channel and RS channel is utilized for the interpolation. The symbol-to-symbol channel time correlation in a given subframe is advantageously used for data channel interpolation from the RS channel estimates. As the time correlation function is dependent on the Doppler spread, this approach first estimates the Doppler spread due to the UE mobility.

Two approaches are proposed for Doppler estimation.

(i) An RS channel estimate cross correlation based approach (ii) An RS channel estimate phase linearity based approach With knowledge of the estimated Doppler spread, the time correlation between the data channels and the RS channels can be derived and used for interpolation of data channel estimates from the RS channel estimates.

Figure 2:
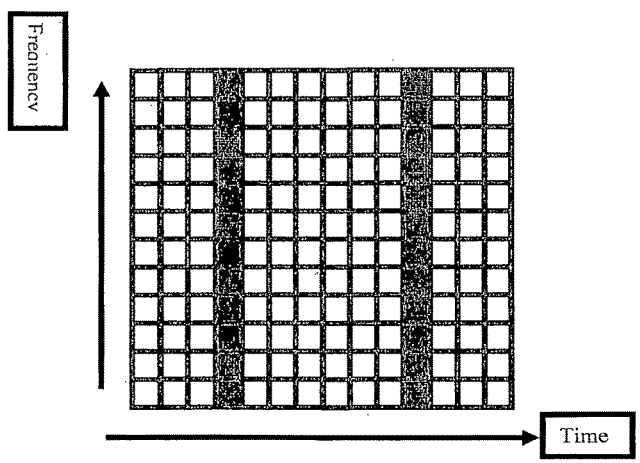
Figure 3:
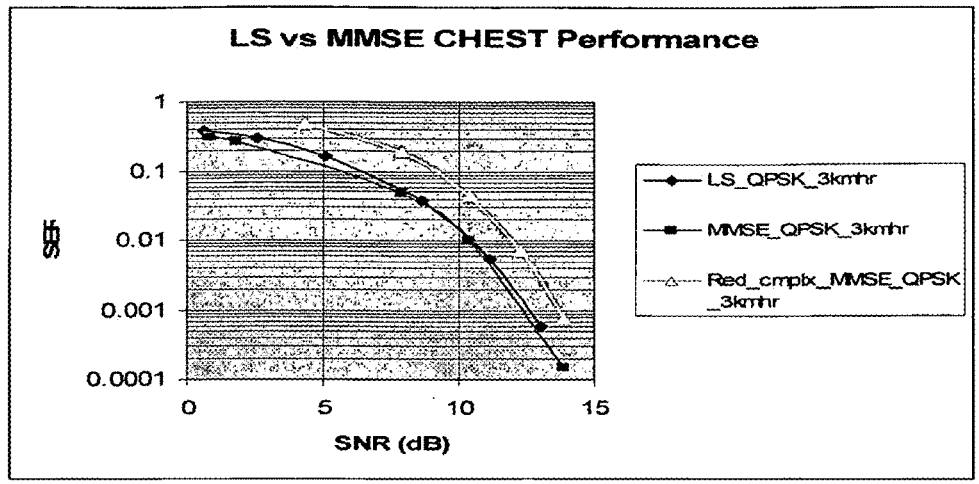
FIG. 3 illustrates SER vs. SNR for QPSK modulation and UE mobility of 3 Km/hr.
Figure 4:
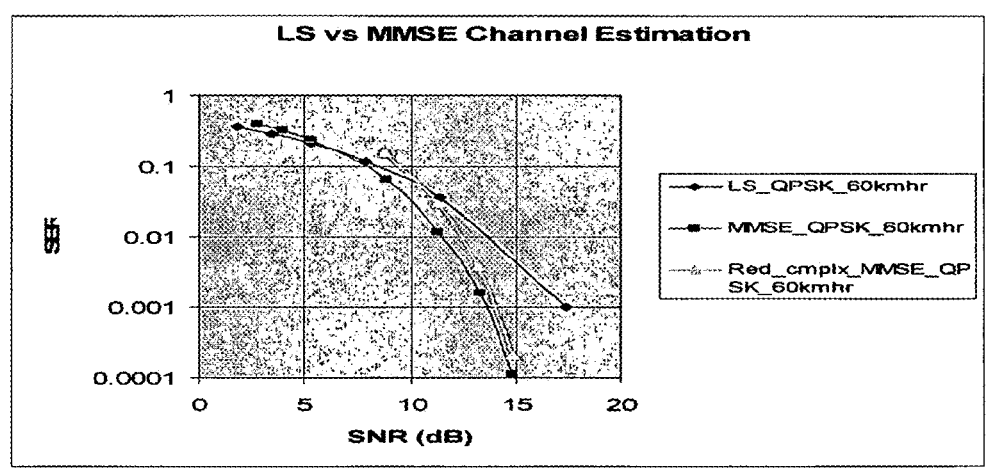
FIG. 4 illustrates SER vs. SNR for QPSK modulation and UE mobility of 60 Km/hr.
Figure 5:
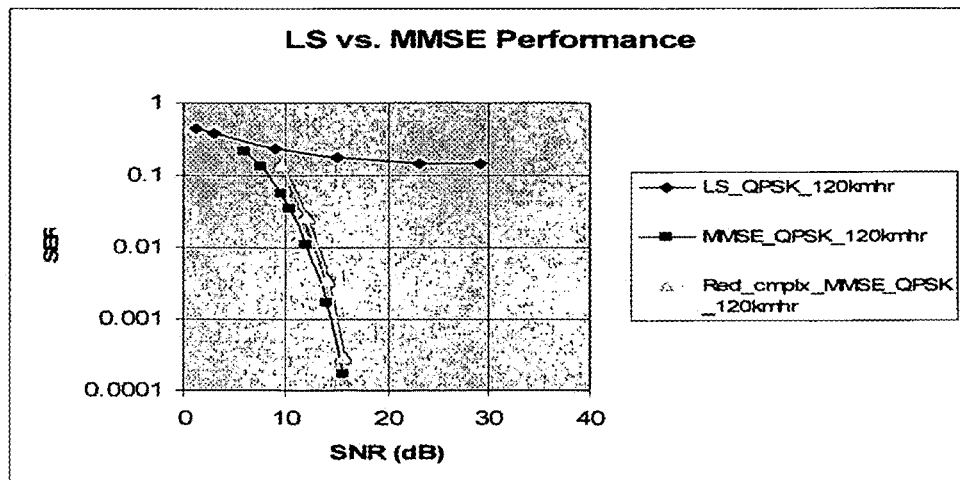
FIG. 5 illustrates SER vs. SNR for QPSK modulation and UE mobility of 120 Km/hr.
Figure 6:
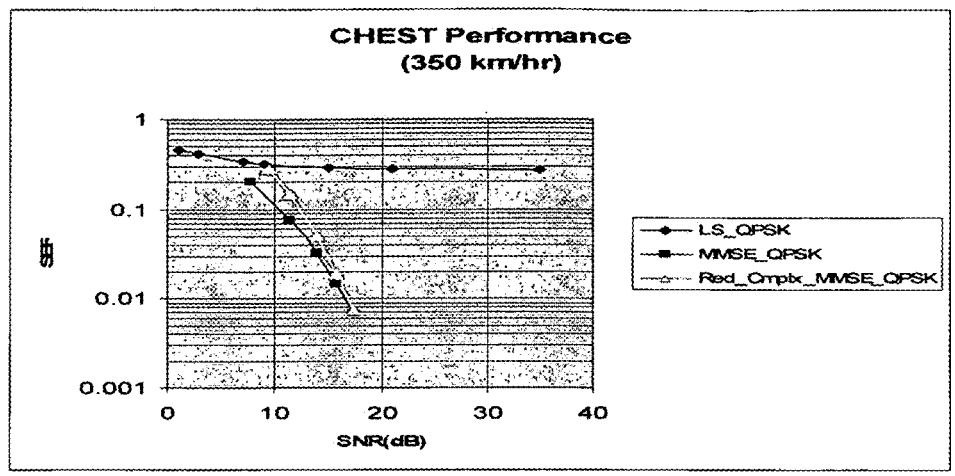
FIG. 6 illustrates SER vs. SNR for QPSK modulation and UE mobility of 350 Km/hr.

With reference to FIG. 2 which shows the uplink PRB and RS structure, this data interpolation method can be performed for each data subcarrier across the 14 symbols of the subframe. Since all these 14 symbols are at the same frequency for a given subcarrier, the frequency correlation is unity across all 14 symbols for a given subcarrier. However, the time correlation across the symbols will be different depending on the symbol spacing the UE mobility. By estimating Doppler spread and using it to generate time correlation among the subcarriers across the symbols, it is possible to interpolate accurately the data channel estimates from the RS channel estimates.

This third aspect of the present invention has three primary steps: (1) generate user equipment Doppler spread estimation from the RS channel estimates, (2) use Doppler estimates from Step 1 to generate the time correlation matrix of data symbols in relation to the RS symbols, (3) interpolate the data channel estimates from RS channel estimates using the time correlation matrix from Step 2.

For step one, the user equipment Doppler spread estimation is generated using the cross correlation between the two RS symbols in the Slot 0 and Slot 1 of the uplink subframe. From Equation (5) we have $$r_t(l) = J_o(2\pi f_{mac} l T_i)$$

where $J_o$ is Bessel function zeroth order and first kind, $F_{max}$ is the maximum Doppler spread of the UE, $T_s$ is the OFDMA/SCFDMA total symbol duration (symbol plus the CP duration), and l is the symbol index.

Figure 17:
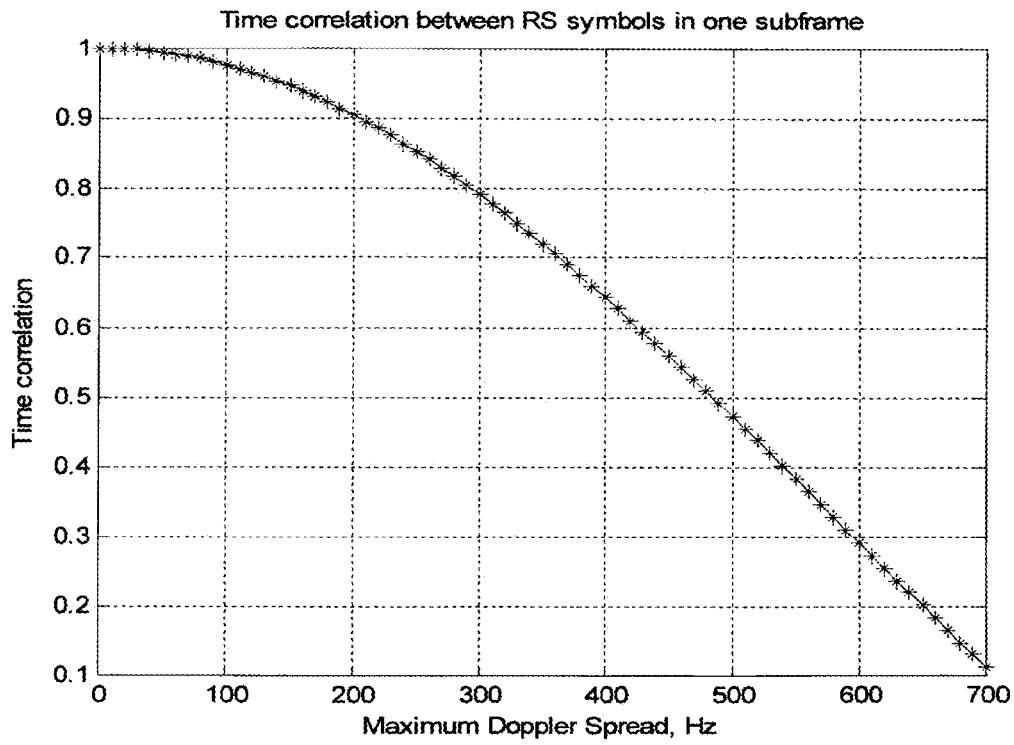
FIG. 17 illustrates time correlation between Slot 0 and Slot 1 RS symbols vs. maximum Doppler spread for LTE Uplink.

The time correlation between the RS in slot 0 and slot 1, is plotted as a function of the maximum Doppler spread in FIG. 17.

As part of Step one of the method in this aspect of the invention, the Doppler estimation is generated using the RS channel estimates from Slot 0 and Slot 1 obtained through RC-MMSE technique, which is used to generate a cross-correlation, $C_{s0\_s1}$ as follows:

$$C_{s0\_s1} = \frac{1}{N_{RB\_len}} \sum_{i=1}^{N_{RB\_len}} RS_{s0}(i)RS_{s1}^*(i) \quad (12)$$

where $RS_{s0}$ and $RS_{s1}$ are slot 0 and slot 1 reference signals, $N_{RB\_len}$ is the number of RBs allocated times 12 and * indicates complex conjugation.

The value obtained from step 1 is subtracted from the correlation values corresponding to a finite number of $f_{max}$ values (50, 100, 150, 200, 250, 300, 350, 400, 450, 500, 550, 600 Hz) computed as per Eqn. (5) and stored in the DSP memory. The $f_{max}$ corresponding to the least error from step (2) is considered as the best approximation for the Doppler spread estimate for the UE.

Figure 18:
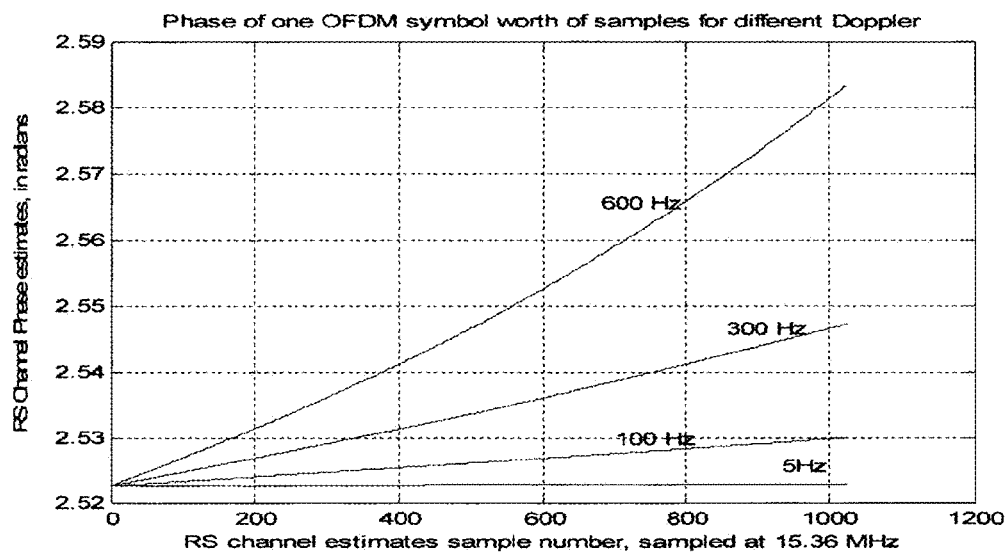
FIG. 18 illustrates RS channel phase estimates vs. RS channel estimates sample number for various Doppler spreads of 5 Hz, 100 Hz, 300 MHz, 600 Hz.

This third approach in the present invention is based on piecewise linear approximation to the phase of the RS channel estimates. As shown in FIG. 18, the phase of the estimated RS channel has a piece-wise linear relationship with the RS channel estimates samples.

With φ defined as the phase of the RS channel estimates, the differentiation of φ w.r.t time provides an estimate of the maximum Doppler spread. The differentiation can equivalently be implemented by taking the slope of the RS channel estimates phase vs. the sample relationship shown in FIG. 18.

$$\frac{d\phi}{dt} = \frac{\Delta\phi}{\Delta t} = 2\pi f_{max} \quad (13)$$

The procedure for obtaining the Doppler spread may be summarized as follows: first, perform RS channel estimation using the present invention RC-MMSE method described above, second, calculate the phase of the lowest subcarrier and the highest subcarrier channel estimates (this can be calculated by $\tan^{-1}(Y/X)$ where Y is the imaginary part of the channel estimates, and X is the real part of the channel estimates), and third, take the difference between the phase is divided by the equivalent sample time to obtain $2\pi f_{max}$.

The estimated Doppler spread is used to generate the time correlations that are needed for data channel interpolation. Two time correlation matrices need to be generated. The first is $R_{pp}$, the pilot autocorrelation matrix, and the second is $R\hat{p}\_d$, the cross-correlation between the noisy pilot channel estimate and the data channel estimates.

For the LTE uplink resource block shown in FIG. 2, the time autocorrelation among the two pilot channel estimates in a row, $R_{pp}$ is a 2×2 matrix and may be generated from Eqn. (5). The matrix values for UE mobility of 3 km/hr, 30 km/hr, 120 km/hr, and 360 km/hr are shown below.

$$R_{pp} = \begin{bmatrix} 1.0 & 1.0 \\ 1.0 & 1.0 \end{bmatrix} \text{UE mobility of 3 km/hr at 2 GHz}$$

$$R_{pp} = \begin{bmatrix} 1.0 & 0.9955 \\ 0.9955 & 1.0 \end{bmatrix} \text{UE mobility of 30 km/hr at 2 GHz}$$

$$R_{pp} = \begin{bmatrix} 1.0 & 0.9820 \\ 0.9820 & 1.0 \end{bmatrix} \text{UE mobility of 60 km/hr at 2 GHz}$$

$$R_{pp} = \begin{bmatrix} 1.0 & 0.9289 \\ 0.9289 & 1.0 \end{bmatrix} \text{UE mobility of 120 km/hr at 2 GHz}$$

$$R_{pp} = \begin{bmatrix} 1.0 & 0.4472 \\ 0.4472 & 1.0 \end{bmatrix} \text{UE mobility of 360 km/hr at 2 GHz}$$

Similarly, $R\hat{p}\_d$, the cross correlation matrix for noisy pilot channel estimates and data channel estimates, may be generated from the LTE uplink RS pattern using the present invention RC-MMSE calculation. It is a 14×2 matrix and may be generated for various UE mobility conditions. The matrix values for UE mobility of 3 km/hr, 30 km/hr, 120 km/hr, and 360 km/hr are shown below:

$R\hat{p}\_d$ Matrix for UE mobility of 3 km/hr  (a)

| | |
|---|---|
| 1.0000 | 0.9999 |
| 1.0000 | 0.9999 |
| 1.0000 | 0.9999 |
| 1.0000 | 0.9999 |
| 1.0000 | 1.0000 |
| 1.0000 | 1.0000 |
| 1.0000 | 1.0000 |
| 1.0000 | 1.0000 |
| 1.0000 | 1.0000 |
| 1.0000 | 1.0000 |
| 0.9999 | 1.0000 |
| 0.9999 | 1.0000 |
| 0.9999 | 1.0000 |
| 0.9999 | 1.0000 |

$R\hat{p}\_d$ Matrix for UE mobility of 30 km/hr  (b)

| | |
|---|---|
| 0.9989 | 0.9875 |
| 0.9995 | 0.9898 |
| 0.9999 | 0.9920 |
| 1.0000 | 0.9939 |
| 0.9999 | 0.9955 |
| 0.9995 | 0.9969 |
| 0.9989 | 0.9980 |
| 0.9980 | 0.9989 |
| 0.9969 | 0.9995 |
| 0.9955 | 0.9999 |
| 0.9939 | 1.0000 |
| 0.9920 | 0.9999 |
| 0.9898 | 0.9995 |
| 0.9875 | 0.998 |

-continued

Rp̂_d Matrix for *UE* mobility of 60 km/hr (c)

| | |
|---|---|
| 0.9955 | 0.9504 |
| 0.9980 | 0.9597 |
| 0.9995 | 0.9681 |
| 1.0000 | 0.9755 |
| 0.9995 | 0.9820 |
| 0.9980 | 0.9875 |
| 0.9955 | 0.9920 |
| 0.9920 | 0.9955 |
| 0.9875 | 0.9980 |
| 0.9755 | 1.0000 |
| 0.9820 | 0.9995 |
| 0.9755 | 0.9980 |
| 0.9820 | 0.9995 |
| 0.9755 | 1.0000 |
| 0.9681 | 0.9995 |
| 0.9597 | 0.9980 |
| 0.9504 | 0.9955 |

Rp̂_d Matrix for *UE* mobility of 120 km/hr (d)

| | |
|---|---|
| 0.9820 | 0.8088 |
| 0.9920 | 0.8436 |
| 0.9980 | 0.8754 |
| 1.0000 | 0.9039 |
| 0.9980 | 0.9289 |
| 0.9920 | 0.9504 |
| 0.9820 | 0.9681 |
| 0.9681 | 0.9820 |
| 0.9504 | 0.9920 |
| 0.9289 | 0.9980 |
| 0.9039 | 1.0000 |
| 0.8754 | 0.9980 |
| 0.8436 | 0.9920 |
| 0.8088 | 0.9820 |

Rp̂_d Matrix for *UE* mobility of 360 km/hr (e)

| | |
|---|---|
| 0.8436 | −0.1383 |
| 0.9289 | −0.0086 |
| 0.9820 | 0.1369 |
| 1.0000 | 0.2915 |
| 0.9820 | 0.4472 |
| 0.9289 | 0.5962 |
| 0.8436 | 0.7307 |
| 0.7307 | 0.8436 |
| 0.5962 | 0.9289 |
| 0.4472 | 0.9820 |
| 0.2915 | 1.0000 |
| 0.1369 | 0.9820 |
| −0.0086 | 0.9289 |
| −0.1383 | 0.8436 |

Based on MMSE estimation theory, the time domain interpolated data channel estimate from RS channel estimates may be written as $$\hat{H}_{interp\_data} = R_{\hat{p}\_d}(R_{pp} + \sigma_N^2(X_p X_p^*)^{-1})^{-1}\hat{p} \quad (14)$$

where $$R_{\hat{p}\_d} = E\{H_{\hat{p}} H_d^*\}$$

is the cross correlation matrix between the noisy RS channel estimate and the data channel estimate across the symbols in a subframe.

X is the vector containing pilot or the reference symbol (RS) values, $\hat{\sigma}_N^2$ is the variance of the noise per RS tone, $\hat{p}$ is the RS channel estimate, which is $\hat{H}_{red\_cmplx}$, from RC-MMSE channel estimation procedure.

By using similar simplifications used in deriving the RC-MMSE channel estimation, the Eqn. (14) may be written as $$\hat{H}_{interp\_data} = R_{\hat{p}\_d}\left(R_{pp} + \frac{\beta}{SNR}I\right)^{-1}\hat{H}_{red\_cmplx} \quad (15)$$

where β is dependent on the RS constellation (1 for QPSK, 0.5294 for 16-QAM, 0.3724 for 64-QAM), and the SNR is the signal to noise ratio per RS tone.

The procedure for data channel interpolation in the present invention from the RS channel estimates includes the following steps. First, generate RS channel estimate for Slot 0 and Slot 1 using the RC-MMSE procedure described through the use of Equation (2) reproduced below. The generates RS channel estimates of the user for its allocated PRBs ($12*PRB_{alloc\_size} \times 1$ vector).

$$\hat{H}_{red\_cmplx} = R_{HH}\left(R_{HH} + \frac{\beta}{SNR}I\right)^{-1}\hat{H}_{LS}$$

Second, the present invention will estimate the user equipment Doppler spread, $f_{max}$ by using the method described above.

Third, use the pre-calculated matrices $R_{pp}$ and $R\hat{p}\_d$ stored in memory corresponding to the estimated Doppler spread, Fourth, with the knowledge of RC-MMSE estimates of RS, SNR estimates, and the RS constellation, the data channel estimates can be obtained using a linear interpolation as per Eqn. (15).

The linear interpolation mentioned above generated a vector 14×1 which includes 12 data channel estimates. The interpolation is repeated $12*PRB_{alloc\_size}$ times for obtaining all data channel estimates.

The interpolation involves the multiplication of three matrices, (14×2)*(2×2)*(2×1). This interpolation provides a 14×1 vector which includes 12 data channel estimates (and the two RS estimates) for 1 subcarrier across all symbols. This is equivalent to 84 complex multiplications per subcarrier.

For a 10 MHz system, this multiplication needs to be performed for 48×12=576 subcarriers in every one millisecond. Therefore, the number of complex multiplications is equal to 48.384 e06 per second. This is relatively insignificant compared to the 0.6900992e+009 complex multiplications needed for RC-MMSE RS channel estimation.

It is not practical to store all time correlation values in the memory corresponding to all possible Doppler spread. As can be seen from FIG. 2, correlation between the RS symbols in a subframe varies from 1.0 to 0.1 over a range of 0-700 Hz Doppler. At a carrier frequency of 2.0 GHz, UE speed of 360 km/hr translates to a Doppler spread of 600 Hz. It is recommended to store correlation values corresponding to the following set of quantized Doppler spread values. [50 100 150 200 250 300 350 400 450 500 550 600] in Hz.

The performance degradation due to such a quantized approximation of Doppler spread is insignificant. $R_{pp}$ and $R\hat{p}\_d$ matrices are also stored in the memory for the same set of Doppler spread values mentioned above. To avoid any storage requirement, it is also possible to make a binary decision on whether a data channel interpolator is needed or not. If the time correlation value is lower than 0.8, or the Doppler spread value is higher than 300 Hz, then an interpolator is used, otherwise no interpolator for data channel estimates.

Figure 19:
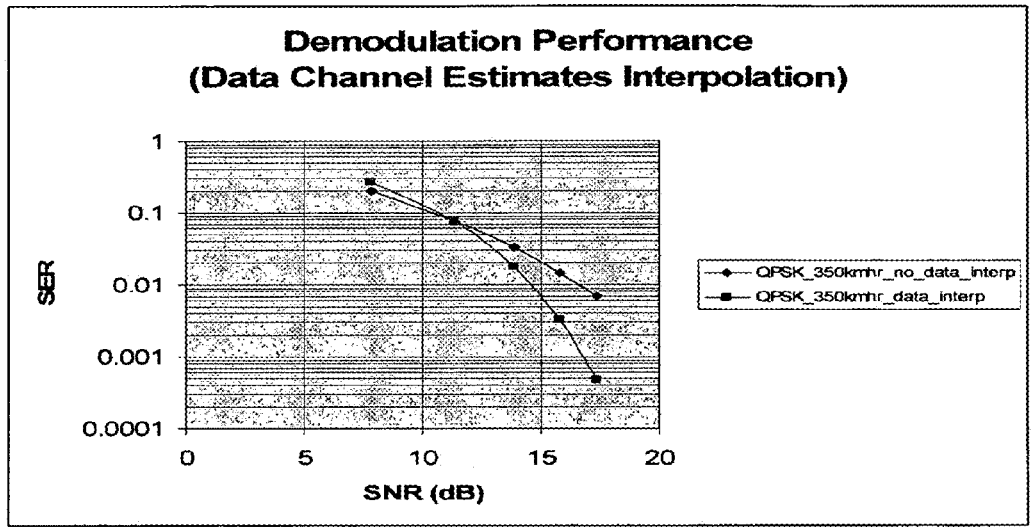
FIG. 19 illustrates SER vs. SNR for QPSK at UE mobility of 350 km/hr. performance comparison with and without data channel estimates interpolation.
Figure 20:
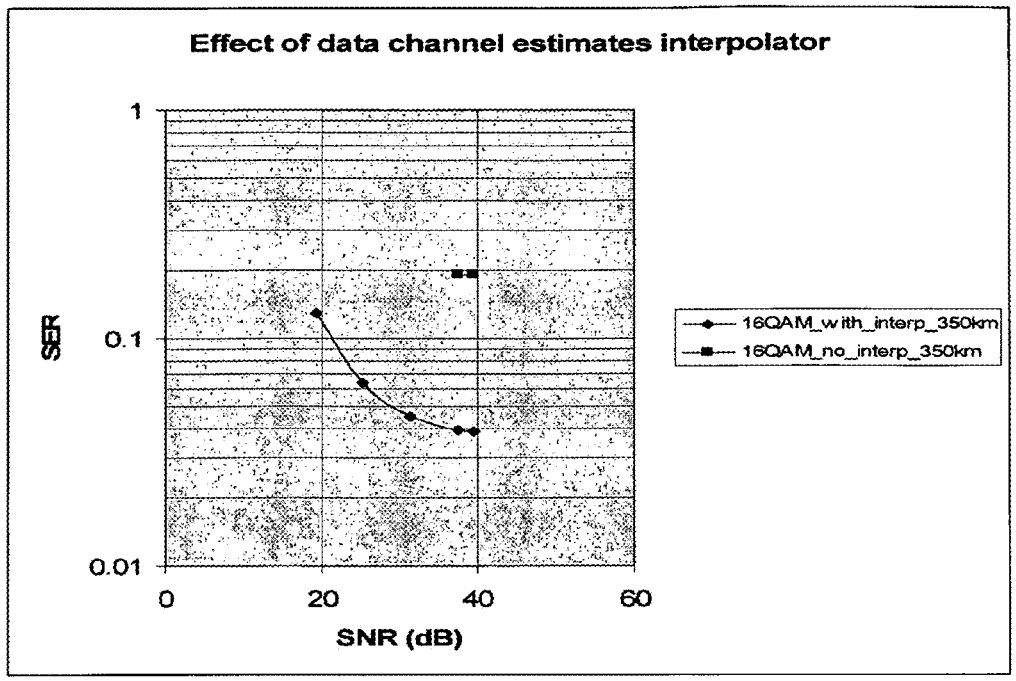
FIG. 20 illustrates SER vs. SNR for 16 QAM at UE mobility of 350 km/hr. performance comparison with and without data channel estimates Interpolation.
Figure 21:
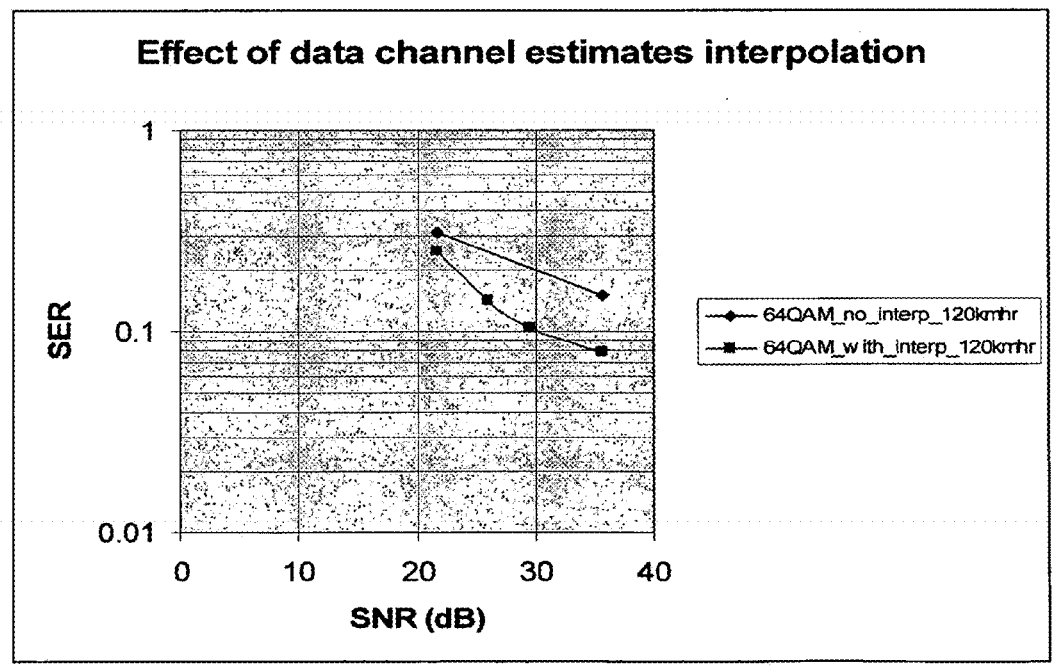
FIG. 21 illustrates SER vs. SNR for 64 QAM at UE mobility of 120 km/hr. performance comparison with and without data channel estimates interpolation.

Simulation results are shown in FIGS. 19-21 subject to the following assumptions: (1) channel estimation and data demodulation performance with and without interpolation for QPSK/16-QAM/64-QAM at higher mobilities is employed, (2) the receiver is assumed to have a single antenna at the eNodeB, (3) uncoded modulation symbol error rate SER vs. SNE plotted, (4) a carrier frequency of 2 GHz is assumed so that the maximum Doppler spread is 600 Hz for 360 km/hr. Note that with two receiver antennas, turbo code and interleaving, an additional approximately 10 dB (depending on code rate and channel) performance gain is expected for the BER vs. SNR.

FIG. 19-21 provide demodulation performance comparisons.

The above-described embodiments of the present application are intended to be examples only. Those of skill in the art may effect alterations, modifications and variations to the particular embodiments without departing from the scope of the application. In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for estimating the uplink receiver channel in a wireless communication system having a transmitter and a receiver, the method comprising:
    providing a transmitter and an uplink receiver for communication with the wireless communication system, wherein uplink receiver channels are calculated using a reduced complexity minimum mean squared error (MMSE) value, $H_{red\_cmplx}$, given by the equation:

$$H_{red\_cmplx} = R_{HH}(R_{HH} + \beta/SNR \times I)^{-1} H_{LS}$$

to estimate a channel for the uplink receiver, wherein:
    $H_{LS}$ is the least squares estimate of the channel,
    the value $R_{HH} = E[HH^*]$ is the frequency domain channel correlation matrix,
    SNR is the average signal-to-noise ratio,
    I is the identity matrix, and
    β is a constant,
    wherein the $R_{HH}$ matrix is dependent only on the subcarrier spacing and the root mean square (r.m.s.) delay spread of the channel for a Long Term Evolution (LTE) network uplink transmission; and
    wherein:
    for QPSK constellation, β=1;
    for 16 QAM constellation, β=0.5294, and
    for 64-QAM transmission, β=0.3724.

2. The method of claim 1, wherein the term $(XX^*)^{-1}$ in the minimum mean square error equation is replaced with its expectation $E\{(XX^*)^{-1}\}$, and wherein the value X is the known reference signal sequence transmitted by the transmitter and * denotes the conjugate transpose operation.

3. The method of claim 1, wherein reference signal (RS) symbol and there is equal probability on all constellation points, $E\{(XX^*)^{-1}\} = E\{|1/Xk|^2\}$ I, where I is an identity matrix and wherein the value X is the known reference signal sequence transmitted by the transmitter and k is a constant.

4. The method of claim 1, wherein the same matrix is used for several subframes until a different SNR estimate is received even if sequence and group hopping are enabled.

5. The method of claim 1, wherein a Long Term Evolution (LTE) network uplink reference signal pattern is used.

6. The method of claim 1, wherein the time correlation function among the reference signal (RS) pattern is set to 1 for a Long Term Evolution (LTE) network uplink RS pattern, and wherein all the reference symbols are in the same OFDM symbol.

7. The method of claim 1, wherein a value of 2 usec for root mean square delay spread is used in generation of $R_{HH}$ when the accuracy of the channel estimates is not sensitive to the r.m.s delay spread value.

8. The method of claim 1, further comprising estimating, for every slot (0.5 msec duration), $H_{LS} = X^{-1}y$ where y is the received vector of reference signal symbols and X is a vector of known transmitted Constant Amplitude Zero AutoCorrelation (CAZAC) sequence in the uplink reference signal symbol.

9. The method of claim 1, further comprising obtaining SNR estimates from previous slot/subframe if user equipment is continuously transmitting.

10. The method of claim 1, further comprising obtaining SNR estimates using the channel estimates $H_{LS}$ in case of discontinuous transmissions when the channel estimation performance is robust to SNR estimate errors.

11. The method of claim 1, further comprising using known values for 0 (1 for QPSK, 0.5294 for 16-QAM, 0.3724 for 64-QAM), SNR estimates, and $R_{HH}$.

12. The method of claim 1 further comprising generating data channel estimates using linear interpolation and the minimum mean square error estimates of the reference signal.

13. The method of claim 1, wherein that SNR be estimated within −3 dB of the actual channel SNR.

14. The method of claim 1 further comprising interpolating the data channel using adaptive steps, estimates of the maximum Doppler spread, and the reference signal channel.

15. An adaptive method of data channel interpolation for use in a receiver of a wireless network, the method comprising:
    in the receiver, generating user equipment Doppler spread estimation from reference signal (RS) channel estimates;
    in the receiver, generating a time correlation matrix of data symbols in relation to RS symbols using the Doppler spread estimates; and
    in the receiver, interpolating data channel estimates from the RS channel estimates using the time correlation matrix, wherein the time correlation matrix is dependent only on the subcarrier spacing and the root mean square (r.m.s.) delay spread of the channel for a Long Term Evolution (LTE) network uplink transmission.

16. A transmission system that estimates the uplink receiver channel in a wireless communication system, the system comprising:

a transmitter; and an uplink receiver, wherein uplink receiver channels are calculated using a reduced complexity minimum mean squared error (MMSE) value, $H_{red\_cmplx}$, given by the equation:

$$H_{red\_cmplx} = R_{HH}(R_{HH} + \beta/SNR \times I)^{-1} H_{LS}$$

to estimate a channel for the uplink receiver, wherein:

$H_{LS}$ is the least squares estimate of the channel, the value $R_{HH} = E[HH^*]$ is the frequency domain channel correlation matrix, SNR is the average signal-to-noise ratio, I is the identity matrix, and $\beta$ is a constant, wherein the $R_{HH}$ matrix is dependent only on the subcarrier spacing and the root mean square (r.m.s.) delay spread of the channel for a Long Term Evolution (LTE) network uplink transmission; and wherein:
    for QPSK constellation, $\beta=1$;
    for 16 QAM constellation, $\beta=0.5294$, and
    for 64-QAM transmission, $\beta=0.3724$.

\* \* \* \* \*